United States Patent
Boehm et al.

[15] 3,657,602
[45] Apr. 18, 1972

[54] METHOD AND MEANS FOR DETECTING INCIPIENT CAPACITOR FAILURE

[72] Inventors: Paul C. Boehm; Theodore R. Kennedy, both of Willingboro, N.J.

[73] Assignee: Inductotherm Corporation, Rancocas, N.J.

[22] Filed: Apr. 5, 1971

[21] Appl. No.: 131,015

[52] U.S. Cl. .................317/12 R, 317/53, 324/54, 324/60, 340/253 X
[51] Int. Cl. ..................................................H02h 7/16
[58] Field of Search ................317/12 A, 12 B, 12 R, 53; 324/54, 60 R, 60 C; 340/253 Y, 248; 307/129

[56] References Cited

UNITED STATES PATENTS 2,617,859  11/1952  Kraft ..........................324/60 R
3,015,774  1/1962  Eigen...........................324/54
2,363,898  11/1944  Partington ..................317/12 A

*Primary Examiner*—J. D. Miller
*Assistant Examiner*—Harvey Fendelman
*Attorney*—Seidel, Gonda & Goldhammer

[57] ABSTRACT

Incipient failure of a capacitor operating as a part of an induction furnace circuit is detected by monitoring the capacitor to determine the presence of high-frequency signals generated by the capacitor as its dielectric material deteriorates. The lower limit of the frequencies of such signals is in the range from 50 to 200 kHz. The sensing apparatus for a 3 kHz induction heating circuit includes detector means for converting the generated signals exceeding about 150 kHz into a control signal whose level exceeds a predetermined value when the generated signals are representative of incipient deterioration of the dielectric. Indicator means responsive to the control signal is operated when the latter signal exceeds said predetermined value, and may disconnect power from the capacitor.

10 Claims, 1 Drawing Figure

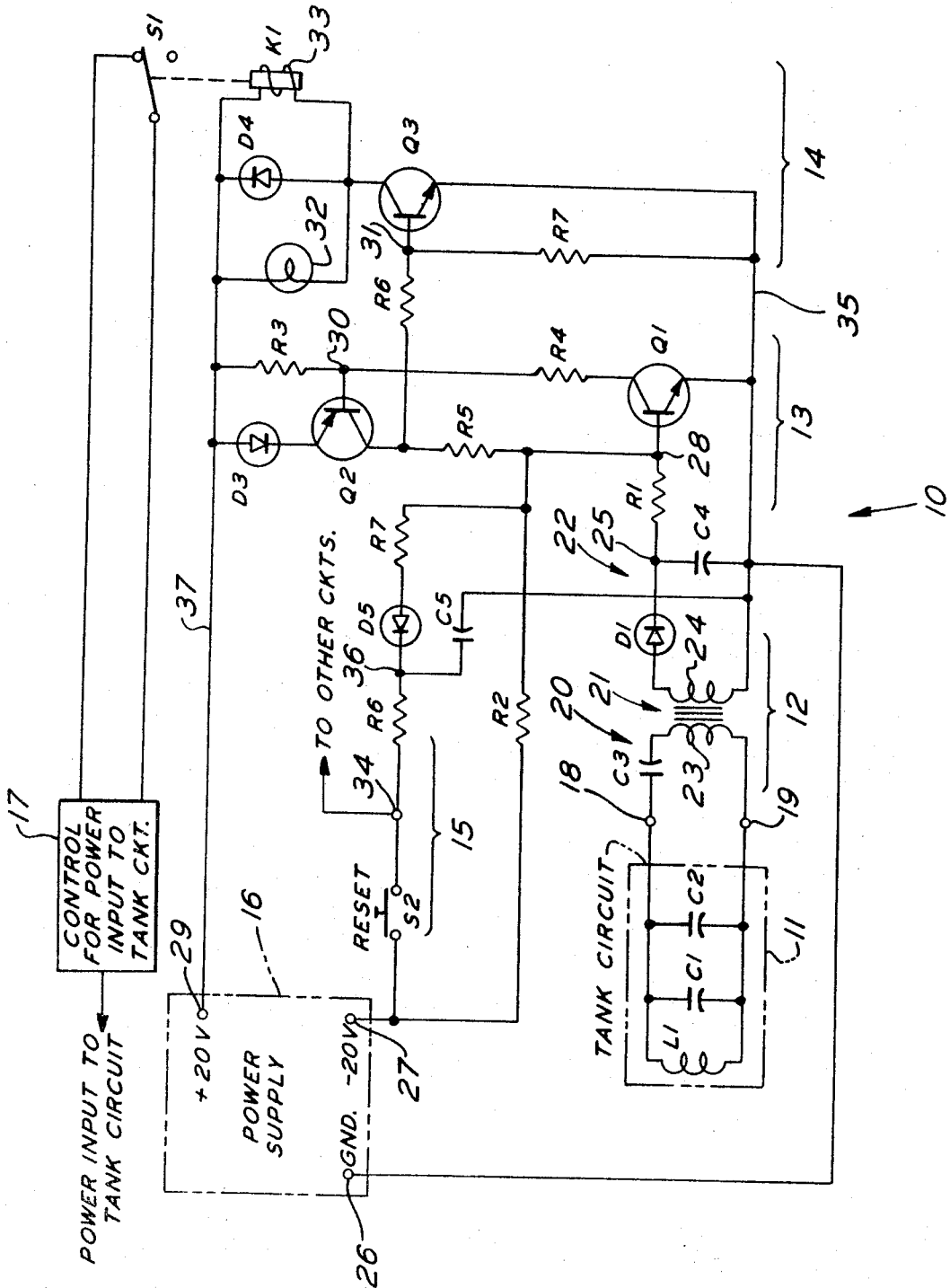

ETHOD AND MEANS FOR DETECTING INCIPIENT CAPACITOR FAILURE

DETAILED DESCRIPTION

This invention is concerned with a method and means for determining incipient failure of a capacitor operating as part of an induction heating or melting circuit.

Banks of capacitors are conventionally used as a part of a tank circuit of an induction heating and melting furnace. Such capacitors have a finite life; and are subject to failure during furnace operation. It is essential, in view of the size of these capacitors and the possible danger to life and property in the event of failure under load to detect incipient failure and to shut down the power input to the tank circuit before failure actually occurs.

The causes of capacitor failure are built into a capacitor by reason of its inherent operating characteristics. An A.C. load impressed on a capacitor is always accompanied by power losses due to dielectric absorption, the flow of leakage current, plate resistance, etc. All of these power losses are converted to heat which raises the temperature of the capacitor. As the temperature rises, the resistance of the insulating material in the capacitor decreases, thus increasing the leakage current. Such current may be concentrated in a few paths of low cross section locally heating the dielectric and further reducing its local resistance and increasing the leakage current. As the dielectric of the capacitor is heated, rapid deterioration is likely to occur, particularly if moisture is present. Ultimately, breakdown results followed by flash-over and corona discharge.

Capacitor failure can occur in two modes. In the initial mode, a high impedance fault develops permitting internal arcing to occur, sometimes on each cycle of operation. Such arcing is manifested by a rumbling sound. If permitted to remain on the line, the container of the capacitor is subject to increasing internal pressure as gases generated by the arcing build up. The least that may occur under this condition is a rupture of the container with resultant spillage of insulating oil. In some instances, an explosion can take place. So far as is known, no technique is presently available to detect this mode of failure except to listen for the rumbling sound.

In another mode of failure, an internal short circuit is developed, sometimes as a result of arcing. This second mode of failure can sometimes be detected successfully when the increase in current caused by the short circuit trips the overload circuit on the main power supply. However, reliance on this approach to provide protection is not satisfactory when the incremental increase in power required by the shorted capacitor is within the range of operation of the overload trip on the main power supply, or when the response of the overload trip is slower than the build-up of heat and pressure in the container of the capacitor. Furthermore, a faulty capacitor may never short and would remain in operation undetected.

It is therefore a primary object of the present invention to provide a method and means for detecting incipient capacitor failure without relying upon increases in the load current.

It is a further object of the present invention to provide a method and means for detecting incipient capacitor failure of only one of a bank of capacitors connected in parallel.

Briefly, the invention is based on a discovery that a capacitor in the initial stages of deterioration will generate high-frequency signals as dielectric breakdown occurs. The lower limit of such signals is in the frequency range 50 to 200 KHz. By monitoring the capacitors for the presence of such high frequency signals, and by converting them to a control signal whose level will exceed a predetermined value when the deterioration reaches a significant level, it is possible to operate an indicator means which will signal the deteriorating condition and/or operate a control circuit which will remove power from the capacitor bank.

The features of this invention for which protection is sought are pointed out with particularity in the appended claims. The invention itself, however, both as to its organization and method of organization, together with further objects and advantages thereof, may best be understood by reference to the following description taken in connection with the accompanying drawing, wherein like parts in the single FIGURE of the drawing are identified by the same reference character, and wherein the single FIGURE is an electrical schematic showing means for detecting incipient capacitor failure.

Referring now to the drawing, reference numeral 10 designates apparatus suitable for protecting tank circuit 11 which is representative of a tank circuit used as part of an induction heating or melting furnace (not shown). Apparatus 10 comprises first circuit means 12, second circuit means 13, operable indicator means 14, reset circuit 15, and power supply 16.

For induction melting furnaces below about 100 Kw, the resonant frequency of the tank circuit is of the order of magnitude of 3 KHz; and it is in this environment that the circuit shown in the drawing operates. For illustrative purposes, the tank circuit is shown as a parallel combination of inductor L1, and capacitors C1 and C2. The tank circuit is supplied with operating power by a suitable oscillator circuit and switch (now shown), whose operation is under the influence of control means 17. As long as switch S1 is closed, control means 17 is operative and will effect the application of power to tank circuit 11. When switch S1 is opened, control means 17 will be inoperative and power will be removed from tank circuit 11.

In tank circuit 11, capacitors C1 and C2 represent the capacitors whose performance is being monitored by apparatus 10. First circuit means 12 of apparatus 10 is connected directly across capacitors C1 and C2 of the tank circuit by terminals 18 and 19. Circuit means 12 comprises high-pass filter 20, isolation transformer 21 and detector circuit 22. Filter 20 includes capacitor C3 in series with primary winding 23 of isolation transformer 21. The values of these components, when the resonant frequency of the tank circuit is about 3 KHz, are selected such that they will operate as a high-pass filter circuit attenuating signals appearing at terminals 18 and 19 in the frequency range below about 150 KHz by about 60 db. Filter 20 thus will effect the transmission of signals greater than about 150 kHz, and apply such signals to detector circuit 22. The detector circuit, which is associated with secondary 24 of transformer 21, includes diode D1 and capacitor C4, and will produce a rectified control signal whose level is functionally related to signals passed by filter 20.

Second circuit means 13 comprises transistors Q1 and Q2 together with their associated bias circuitry. In the absence of a control signal at node 25 at the output of the detector circuit, both transistors Q1 and Q2 will be in a non-conducting state. Transistor Q1 is cut off because its base-emitter junction will be reverse-biased by reason of the flow of current from ground terminal 26 of the power supply and ground bus 35 through primary 24 of transformer 21, diode D1, and resistors R1 and R2 to the −20 volt terminal 27 of power supply 16. By a proper selection of components, it is possible to maintain node 28 at the base of transistor Q1 at a voltage of about −2 volts with respect to the voltage of the emitter of this transistor. Being cut off, no collector current can flow in this transistor with the result that no base current will flow through transistor Q2. As a consequence, this transistor will also be cut off.

As the dielectric material of capacitors C1 and C2 begins to deteriorate, RF signals will be generated and appear at terminals 18 and 19. The lower limit of the signals will lie in the range 50 to 200 KHz. Signals, whose frequencies exceed the upper limit of attenuation of filter 20, will appear across secondary 24 of transformer 21. As the voltage across secondary 24 rises, control current will begin to flow through resistor R1 into node 27 of the power supply. When the level of the control signal exceeds a predetermined value, sufficient control current will flow to cause the voltage at node 28 to rise to about 0.7 volt with respect to the emitter of transistor Q1 thus forwardly biasing the base-emitter junction of this transistor causing it to change from its non-conducting state to its conducting state. When transistor Q1 conducts, collector current flows from terminal 29 and B+ bus 37 through the series resistors R3 and R4. As the voltage at node 30 between these resistors drops from +20 volts to about +18.6 volts, the bias established by emitter diode D3 will be overcome, and the emitter-base junction of transistor Q2 will be forwardly biased. This transistor thus begins to conduct as soon as transistor Q1 changes state. The flow of collector current in transistor Q2 through resistor R5 will provide sufficient base current to transistor Q1 to maintain conduction of the latter even if the rectified control signal appearing at node 28 were to decrease below the predetermined value which had been sufficient to initially turn on transistor Q1.

From the above description, it can be seen that transistor Q1 operates as an active device which responds to a control signal for changing state when the level of the control signal exceeds a predetermined value. Transistor Q2 corresponds to a latching means for maintaining the active device in its changed state independently of the level of the control signal, once such level exceeds the predetermined value.

When transistor Q2 conducts, collector current is furnished to resistors R6 and R7. The voltage at node 31 between these last-mentioned resistors, due to such current, rises above the ground potential of bus 35 and forwardly biases the base-emitter junction of transistor Q3 which constitutes a portion of the operable indicator means 14. When transistor Q3 conducts, its collector current will flow through the parallel combination of indicator lamp 32, damper diode D4 and coil 33 of relay K1. The illumination of lamp 32 serves as a visual indication that a potentially dangerous condition exists with respect to the capacitors of the tank circuit. The flow of current through coil 33 of relay K1 opens normally closed switch S1 disabling control means 17 and removing power from the tank circuit.

Removal of power from the tank circuit as a consequence of the operation of means 14 will result in the disappearance of the rectified control signal at node 28. However, both transistors Q1 and Q2 will remain in their conducting states because of the latching operation previously described. To reset the apparatus, switch S2 is manually closed momentarily to apply a negative signal to terminal 34. The flow of collector current through resistor R5 and through series resistors R6 and R7 of the reset circuit 15 drops the voltage at node 28 to a level below the ground potential of bus 35 with the result that the base-emitter junction of transistor Q1 becomes reversed biased and conduction of this transistor ceases. When transistor Q1 stops conducting, transistor Q2 also stops conducting, thereby cutting off base current to transistor Q3. When this last-mentioned transistor stops conducting, relay coil 33 in its collector circuit is de-energized, thus returning switch S1 to its closed position shown in the drawing. Diode D4 shunting the coil 33 serves to dampen the inductive kickback produced when coil 33 is de-energized. Diode D5 in circuit 15 is provided to isolate the second circuit means from other circuits connected to node 34.

Capacitor C5 connected between the ground bus 35 and node 36 between diode D5 and resistor R6, serves to smooth out transients generated in the bias circuitry as a result of the opening and/or closing of the contacts of reset switch S2. In the absence of capacitor C5, it would be possible for transistor Q1 to remain conducting when the reset switch S2 is operated.

Upon such operation, the contacts of switch S2 are bridged causing capacitor C5 to charge rapidly through relatively small resistor R6 until the voltage at node 36 is approximately the −20 volts at node 27. When reset switch S2 is released, capacitor C5 discharges through the series combination of the primary 24 of transformer 21, diode D1 and resistors R1 and R7, and diode D5. The time-constant associated with this combination of components is much larger than the charging time-constant with the result that node 28 is held at a negative voltage relative to the emitter of transistor Q1 long enough for this transistor to stop conducting regardless of contact bounce associated with the operation of reset switch S2.

While the above description is directed to a 3 KHz tank circuit used in an induction furnace, the invention is also applicable to static testing of capacitors, and to tank circuits whose resonant frequency may be several orders of magnitude higher than 3 KHz. In the latter case, the filter associated with the tank circuit would be designed to pass only those frequencies greater than the operating frequency. The predetermined level of the control signal necessary to cause operation of the indicator means is determined by trial and error, being dependent on the size and type of capacitor being monitored.

The present invention may be embodied in other specific forms without departing from the spirit or essential attributes thereof and, accordingly, reference should be made to the appended claims, rather than to the foregoing specification as indicating the scope of the invention.

What is claimed is:

1. A method for detecting incipient deterioration of the capacitor in an A.C. power circuit including the steps of:
   a. monitoring said capacitor to detect high-frequency signals produced by said capacitor; and
   b. producing an indication when the level of said signals, whose lower frequency limit is in the range from 50 to 200 KHz, exceeds a predetermined value.

2. Sensing apparatus for detecting incipient deterioration of a capacitor in an A.C. power circuit including:
   a. first circuit means to detect the presence of signals of a frequency in excess of a predetermined value across said capacitor;
   b. operable indicator means; and
   c. second circuit means responsive to said signals for operating said indicator means when the level of said signals exceed a predetermined value.

3. Sensing apparatus according to claim 2 wherein the predetermined value of the frequency of said signals is in the range of 50 to 200 KHz.

4. Sensing apparatus according to claim 3 wherein said first circuit means includes a high-pass filter associated with said capacitor for effecting transmission of signals greater than the lower value of said range.

5. Sensing apparatus according to claim 4 wherein said first circuit means includes an isolation transformer whose primary is part of said high-pass filter, and a detector circuit associated with the secondary of said transformer for producing a rectified control signal whose level is functionally related to the signals passed by said filter.

6. Sensing apparatus according to claim 5 wherein said second circuit includes an active device responsive to said control signal for changing state when the level of said control signal exceeds a predetermined value.

7. Sensing apparatus according to claim 6 wherein the operation of said indicator means is responsive to a change in state of said active device.

8. Sensing apparatus according to claim 7 wherein said indicator means includes operable control means for controlling the application of power to said capacitor, operation of said indicator means causing operation of said control means whereby power is removed from said capacitor.

9. Sensing apparatus according to claim 6 wherein said second circuit includes latching means for maintaining said active device in its changed state independently of the level of said control signal once such level exceeds said predetermined value.

10. Sensing apparatus according to claim 9 wherein a reset circuit is provided for selectively returning said active device to its original state in the absence of a control signal whose level exceeds said predetermined value.

* * * * *